US010735105B2

(12) United States Patent
Goergen et al.

(10) Patent No.: US 10,735,105 B2
(45) Date of Patent: Aug. 4, 2020

(54) HIGH POWER AND DATA DELIVERY IN A COMMUNICATIONS NETWORK WITH SAFETY AND FAULT PROTECTION

(71) Applicant: CISCO TECHNOLOGY, INC., San Jose, CA (US)

(72) Inventors: Joel Richard Goergen, Soulsbyville, CA (US); Chad M. Jones, Doylestown, OH (US); Douglas Paul Arduini, San Ramon, CA (US); Richard Anthony O'Brien, Livermore, CA (US); Daniel Lee Barsotti, Sacramento, CA (US); Sung Kee Baek, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/971,729

(22) Filed: May 4, 2018

(65) Prior Publication Data
US 2019/0342011 A1  Nov. 7, 2019

(51) Int. Cl.
*H04B 10/07* (2013.01)
*H04B 10/80* (2013.01)
(Continued)

(52) U.S. Cl.
CPC ......... *H04B 10/808* (2013.01); *H02H 1/0007* (2013.01); *H02J 1/00* (2013.01); *H04B 10/07* (2013.01); *H04B 10/0779* (2013.01)

(58) Field of Classification Search
None
See application file for complete search history.

(56) References Cited

U.S. PATENT DOCUMENTS 3,335,324 A * 8/1967 Buckeridge ............ H02H 7/005
361/48
4,811,187 A  3/1989 Nakajima
(Continued)

FOREIGN PATENT DOCUMENTS

CN  1209880 C  7/2005
CN  201689347 U  12/2010
(Continued)

OTHER PUBLICATIONS

"Network Remote Power Using Packet Energy Transfer", Eaves et al., www.voltserver.com, Sep. 2012.
(Continued)

*Primary Examiner* — Li Liu
(74) *Attorney, Agent, or Firm* — Cindy Kaplan

(57) ABSTRACT

In one embodiment, a method includes receiving power at an optical transceiver module at a remote network device on a cable delivering power and data from a central network device, operating the remote network device in a low voltage startup mode during fault sensing at the remote network device, transmitting on the cable, a data signal to the central network device, the data signal indicating an operating status based on the fault sensing, and receiving high voltage power from the central network device on the cable at the remote network device upon transmitting an indication of a safe operating status at the remote network device, wherein the remote network device is powered by the high voltage power. An apparatus is also disclosed herein.

35 Claims, 15 Drawing Sheets

(51) Int. Cl.
*H02H 1/00* (2006.01)
*H02J 1/00* (2006.01)
*H04B 10/077* (2013.01)

(56) References Cited

U.S. PATENT DOCUMENTS

| | | |
|---|---|---|
| 6,220,955 B1 | 4/2001 | Posa |
| 6,259,745 B1 | 7/2001 | Chan |
| 6,685,364 B1 | 2/2004 | Brezina |
| 6,826,368 B1 | 11/2004 | Koren |
| 6,855,881 B2 | 2/2005 | Khoshnood |
| 7,325,150 B2 | 1/2008 | Lehr |
| 7,420,355 B2 | 9/2008 | Liu |
| 7,583,703 B2 | 9/2009 | Bowser |
| 7,589,435 B2 | 9/2009 | Metsker |
| 7,593,747 B1 | 9/2009 | Karam |
| 7,616,465 B1 | 11/2009 | Vinciarelli |
| 7,813,646 B2 | 10/2010 | Furey |
| 7,835,389 B2 | 11/2010 | Yu |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,184,525 B2 | 5/2012 | Karam |
| 8,276,397 B1 | 10/2012 | Carlson et al. |
| 8,310,089 B2 | 11/2012 | Schindler |
| 8,345,439 B1 | 1/2013 | Goergen |
| 8,350,538 B2 | 1/2013 | Cuk |
| 8,358,893 B1* | 1/2013 | Sanderson ........... G02B 6/4415 385/100 |
| 8,700,923 B2 | 4/2014 | Fung |
| 8,781,637 B2 | 7/2014 | Eaves |
| 8,829,917 B1 | 9/2014 | Lo et al. |
| 8,836,228 B2 | 9/2014 | Xu |
| 8,842,430 B2 | 9/2014 | Hellriegel et al. |
| 9,024,473 B2 | 5/2015 | Huff |
| 9,184,795 B2 | 11/2015 | Eaves |
| 9,189,043 B2 | 11/2015 | Vorenkamp |
| 9,273,906 B2 | 3/2016 | Goth et al. |
| 9,319,101 B2 | 4/2016 | Lontka |
| 9,373,963 B2 | 6/2016 | Kuznelsov |
| 9,419,436 B2 | 8/2016 | Eaves et al. |
| 9,510,479 B2 | 11/2016 | Vos |
| 9,531,551 B2 | 12/2016 | Balasubramanian |
| 9,590,811 B2 | 3/2017 | Hunter, Jr. |
| 9,640,998 B2 | 5/2017 | Dawson |
| 9,665,148 B2 | 5/2017 | Hamdi |
| 9,693,244 B2 | 6/2017 | Maruhashi et al. |
| 9,734,940 B1 | 8/2017 | McNutt |
| 9,853,689 B2 | 12/2017 | Eaves |
| 9,874,930 B2 | 1/2018 | Vavilala |
| 9,882,656 B2 | 1/2018 | Sipes et al. |
| 9,893,521 B2 | 2/2018 | Lowe |
| 9,948,198 B2 | 4/2018 | Imai |
| 10,007,628 B2 | 6/2018 | Pitigoi-Aron |
| 10,028,417 B2 | 7/2018 | Schmidtke |
| 10,407,995 B2 | 9/2019 | Moeny |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1* | 3/2004 | Bain ........... H01R 27/00 439/172 |
| 2004/0073703 A1* | 4/2004 | Boucher ........... H04L 69/16 709/245 |
| 2005/0197018 A1 | 9/2005 | Lord |
| 2005/0268120 A1 | 12/2005 | Schindler |
| 2006/0202109 A1* | 9/2006 | Delcher ........... H04B 10/806 250/214 R |
| 2007/0103168 A1* | 5/2007 | Batten ........... G01R 27/16 324/527 |
| 2007/0288125 A1 | 12/2007 | Quaratiello |
| 2008/0198635 A1 | 8/2008 | Hussain |
| 2008/0229120 A1 | 9/2008 | Diab |
| 2008/0310067 A1 | 12/2008 | Diab |
| 2010/0077239 A1 | 3/2010 | Diab |
| 2010/0117808 A1* | 5/2010 | Karam ........... H04L 12/10 713/300 |
| 2010/0171602 A1 | 7/2010 | Kabbara |
| 2010/0190384 A1 | 7/2010 | Lanni |
| 2010/0290190 A1 | 11/2010 | Chester |
| 2011/0290497 A1 | 1/2011 | Stenevik |
| 2011/0083824 A1 | 4/2011 | Rogers |
| 2011/0266867 A1 | 11/2011 | Schindler |
| 2012/0064745 A1 | 3/2012 | Ottliczky |
| 2012/0170927 A1 | 7/2012 | Huang |
| 2012/0201089 A1 | 8/2012 | Barth et al. |
| 2012/0231654 A1 | 9/2012 | Conrad |
| 2012/0317426 A1 | 12/2012 | Hunter, Jr. |
| 2012/0319468 A1 | 12/2012 | Schneider |
| 2013/0077923 A1 | 3/2013 | Peeters Weem et al. |
| 2013/0079633 A1 | 3/2013 | Weem |
| 2013/0103220 A1 | 4/2013 | Eaves |
| 2013/0249292 A1* | 9/2013 | Blackwell, Jr. .. H04B 10/25753 307/31 |
| 2013/0272721 A1 | 10/2013 | Van Veen |
| 2014/0258742 A1 | 9/2014 | Chien |
| 2015/0078740 A1 | 3/2015 | Sipes, Jr. |
| 2015/0106539 A1 | 4/2015 | Leinonen |
| 2015/0115741 A1* | 4/2015 | Dawson ........... G06F 1/266 307/125 |
| 2015/0215001 A1 | 7/2015 | Eaves |
| 2015/0333918 A1 | 11/2015 | White, III |
| 2016/0020911 A1* | 1/2016 | Sipes, Jr. ........... H04B 10/808 398/16 |
| 2016/0064938 A1 | 3/2016 | Balasubramanian |
| 2016/0111877 A1 | 4/2016 | Eaves |
| 2016/0134331 A1 | 5/2016 | Eaves |
| 2016/0142217 A1 | 5/2016 | Gardner et al. |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer et al. |
| 2016/0294500 A1* | 10/2016 | Chawgo ........... H04B 10/25753 |
| 2016/0308683 A1 | 10/2016 | Pischl |
| 2016/0352535 A1 | 12/2016 | Hiscock |
| 2017/0054296 A1 | 2/2017 | Daniel |
| 2017/0110871 A1 | 4/2017 | Foster |
| 2017/0146260 A1 | 5/2017 | Ribbich |
| 2017/0155517 A1* | 6/2017 | Cao ........... H04L 12/10 |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0248976 A1 | 8/2017 | Moller |
| 2017/0325320 A1 | 11/2017 | Wendt |
| 2018/0024964 A1 | 1/2018 | Mao |
| 2018/0060269 A1 | 3/2018 | Kessler |
| 2018/0088648 A1 | 3/2018 | Otani |
| 2018/0098201 A1* | 4/2018 | Torello ........... G01S 13/84 |
| 2018/0102604 A1 | 4/2018 | Keith |
| 2018/0123360 A1 | 5/2018 | Eaves |
| 2018/0188712 A1* | 7/2018 | MacKay ........... G05B 19/4155 |
| 2018/0191513 A1 | 7/2018 | Hess |
| 2018/0254624 A1* | 9/2018 | Son ........... H02H 7/10 |
| 2018/0313886 A1 | 11/2018 | Mlyniec |

FOREIGN PATENT DOCUMENTS

| | | |
|---|---|---|
| CN | 201689347 U | 12/2010 |
| CN | 205544597 | 12/2015 |
| CN | 205544597 | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| WO | WO199316407 A1 | 8/1993 |
| WO | WO2010053542 | 5/2010 |
| WO | WO2017054030 | 4/2017 |

(56) References Cited

FOREIGN PATENT DOCUMENTS

| WO | WO2017167926 A1 | 10/2017 |
| WO | WO2018017544 | 1/2018 |
| WO | WO2019023731 A1 | 2/2019 |

OTHER PUBLICATIONS https://www.fischerconnectors.com/us/en/products/fiberoptic.
http://www.strantech.com/products/tfoca-genx-hybrid-2x2-fiber-optic-copper-connector/.
http://www.qpcfiber.com/product/connectors/e-link-hybrid-connector/.
hittps://www.lumentum.com/sites/default/files/technical-library-items/poweroverfiber-tn-pv-ae_0.pdf.
Chen, Real-Time Termperature Estimation for Power MOSEFETs Conidering Thermal Aging Effects:, IEEE Trnasactions on Device and Materials Reliability, vol. 14, No. 1, Mar. 2014.
Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.
Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.
Yencheck, Thermal Modeling of Portable Power Cables, 1993.
Zhang, Machine Learning-Based Temperature Prediction for Runtime Thermal Management across System Components, Mar. 2016.
Data Center Power Equipment Thermal Guidelines and Best Practices.
Dynamic Thermal Rating of Substation Terminal Equipment by Rambabu Adapa, 2004.

\* cited by examiner

HIGH POWER AND DATA DELIVERY IN A COMMUNICATIONS NETWORK WITH SAFETY AND FAULT PROTECTION

TECHNICAL FIELD

The present disclosure relates generally to communications networks, and more particularly, to safety and fault protection in a communications network with combined high power and data delivery.

BACKGROUND

Power over Ethernet (PoE) is a technology for providing electrical power over a wired telecommunications network from power sourcing equipment (PSE) to a powered device (PD) over a link section. In conventional PoE systems, power is delivered over the cables used by the data over a range from a few meters to about one hundred meters. When a greater distance is needed or fiber optic cables are used, power must be supplied through a local power source such as a wall outlet due to limitations with conventional PoE. Furthermore, today's PoE systems have limited power capacity, which may be inadequate for many classes of devices.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
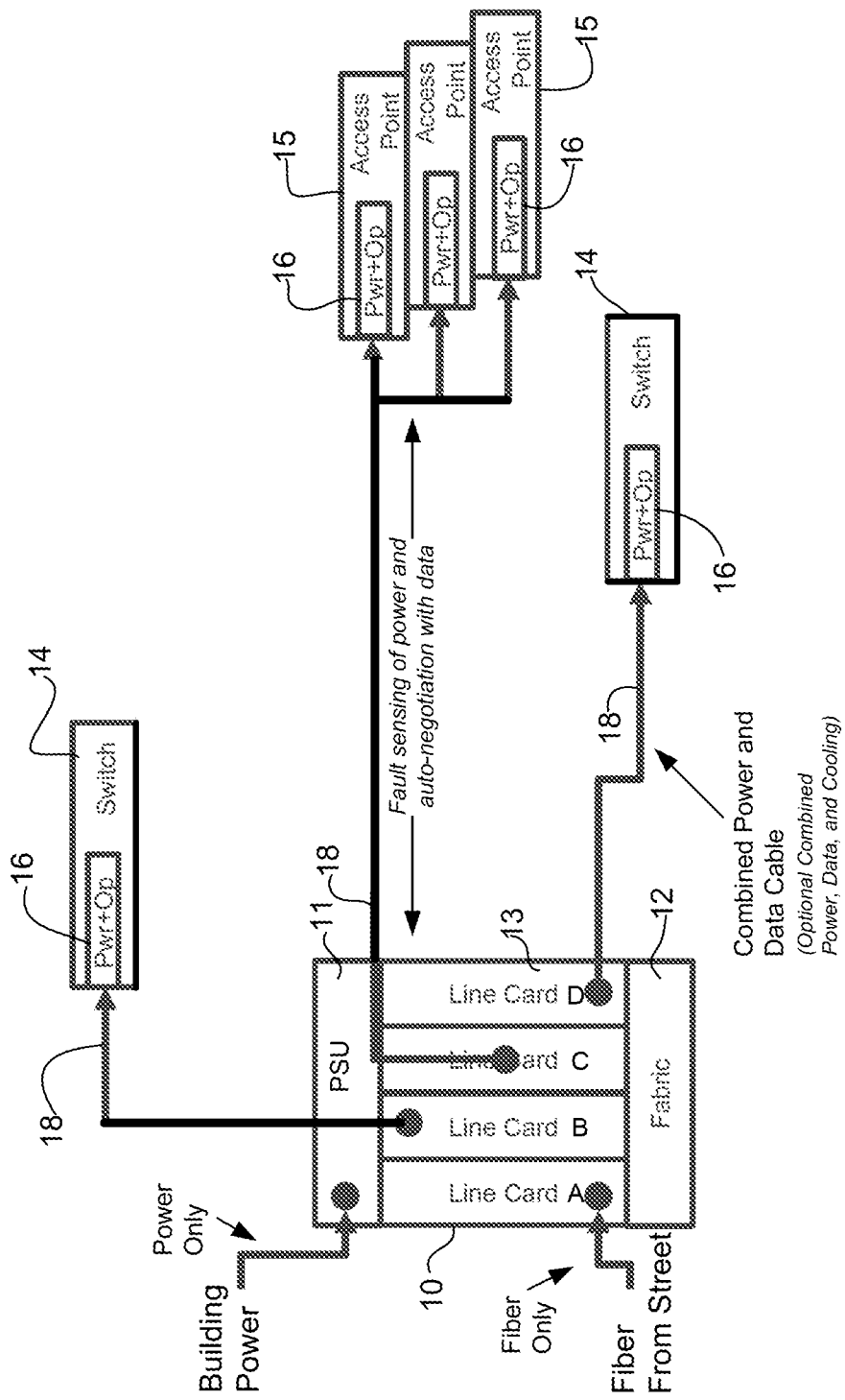
FIG. 1 illustrates an example of a network in which embodiments described herein may be implemented.

In one embodiment, a method includes receiving power at an optical transceiver module at a remote network device on a cable delivering power and data from a central network device, operating the remote network device in a low voltage mode during fault sensing at the remote network device, transmitting on the cable, a data signal to the central network device, the data signal indicating an operating status based on the fault sensing, and receiving high voltage power from the central network device on the cable at the remote network device upon transmitting an indication of a safe operating status of the remote network device, wherein the remote network device is powered by the high voltage power.

In another embodiment, a method generally comprises delivering high voltage direct current (HVDC) pulse power from power sourcing equipment to a powered device over a cable delivering power and optical data, testing a power circuit between the power sourcing equipment and the powered device between pulses, and communicating with the powered device over the cable to identify an operating mode at the powered device based on the testing.

In yet another embodiment, an apparatus generally comprises an optical interface for receiving optical signals on an optical fiber in a power and data cable at an optical transceiver, an electrical interface for receiving power on an electrical wire in the power and data cable at the optical transceiver for powering the apparatus in a high power mode, and a power module for testing a power circuit and delivering data comprising an operating status of the power circuit over the power and data cable to a combined power and data source. The power module is configured for testing the power circuit in a low voltage power mode.

Further understanding of the features and advantages of the embodiments described herein may be realized by reference to the remaining portions of the specification and the attached drawings.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered over the same twisted pair cable used for data. These systems are limited in range to a few meters to about 100 meters. The maximum power delivery capacity of standard PoE is approximately 100 Watts, but many classes of powered devices would benefit from power delivery of 1000 Watts or more. In conventional systems, when a longer distance is needed, fiber optic cabling is used to deliver data and when larger power delivery ratings are needed, power is supplied to a remote device through a local power source.

As previously noted, it is desirable to increase the power available over multi-function cables to hundreds and even thousands of watts. This capability may enable many new choices in network deployments where major devices such as workgroup routers, multi-socket servers, large displays, wireless access points, fog nodes, or other devices are operated over multi-function cables. This capability would greatly decrease installation complexity and improve the total cost of ownership of a much wider set of devices that have their power and data connectivity needs met from a central hub.

In order to overcome the above issues, power and data delivery systems may be designed to carry higher data rates and higher power delivery (and may also carry integrated thermal management cooling) combined into a single cable, as described in U.S. patent application Ser. No. 15/910,203 ("Combined Power, Data, and Cooling Delivery in a Communications Network"), filed Mar. 2, 2018, which is incorporated herein by reference in its entirety. These connections may be point-to-point, such as from a central hub to one or more remote devices (e.g., full hub and spoke layout). In another example, a single combined function cable may run most of the way to a cluster of powered devices and then split, as described in U.S. patent application Ser. No. 15/918,972 ("Splitting of Combined Delivery Power, Data, and Cooling in a Communications Network"), filed Mar. 12, 2018, which is incorporated herein by reference in its entirety. With high power applications, further safety concerns arise. Additional fault detection and safety protections are needed to prevent a life safety event or an equipment malfunction that may cause serious damage.

The embodiments described herein provide high power delivery over a data system (also referred to herein as advanced power over data) in a communications network with fault detection and safety protection (e.g., touch-safe fault protection). In one embodiment, fault sensing is performed through a low voltage safety check combined with a digital interlock that uses the data system to provide feedback on the power system status and set a power operation mode. The fault sensing may be performed, for example, during a low voltage startup or between high power pulses in a pulse power system. As described in detail below, the pulse power may comprise source voltage pulse power (unipolar or bipolar) or load current pulse power with low voltage fault detection between high voltage power pulses. Fault sensing may include, for example, line-to-line fault detection with low voltage sensing of the cable or powered device and line-to-ground fault detection with midpoint grounding. Touch-safe fault protection may also be provided through cable and connector designs that are touch-safe even with high voltage applied. The power safety features provide for safe system operation and installation and removal (disconnect) of components.

Referring now to the drawings, and first to FIG. 1, an example of a network in which embodiments described herein may be implemented is shown. For simplification, only a small number of nodes are shown. The embodiments operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet of Things (IoT) network, Internet, intranet, or any other network).

The network is configured to pass electrical power along with data to provide both data connectivity and electric power to network devices such as switches 14, routers, access points 15, or other electronic components and devices. Signals may be exchanged among communications equipment and power transmitted from power sourcing equipment (PSE) 10 to powered devices (PDs) 14, 15. As described in detail below, the advanced power over data system delivers power to and from a network (e.g., switch/router system) using an interface module 16 (e.g., optical transceiver module) configured to receive and transmit both data (fiber delivered data) and electrical power (high power energy). In one or more embodiments, the power and data may be delivered over a cable comprising both optical fibers and electrical wires (e.g., copper wires), as described in U.S. patent application Ser. No. 15/707,976 ("Power Delivery Through an Optical System"), filed Sep. 18, 2017, which is incorporated herein by reference in its entirety. In one or more embodiments, the system may further provide cooling and deliver combined power, data, and cooling within a single hybrid cable system, as described, for example, in U.S. patent application Ser. Nos. 15/910,203 and 15/918,972, referenced above.

As shown in the example of FIG. 1, the advanced power over data system may use building power supplied to a central network device (hub) (e.g., PSE) 10, which may be located in a premise/entry room, for example. The power may be transmitted from the building entry point to end points (switches 14, access points 15), which may be located at distances greater than 100 meters (e.g., 1 km (kilometer), 10 km, or any other distance), and/or at greater power levels than 100 W (watts) (e.g., 250 W, 500 W, 1000 W, 2000 W or any other power level). The central network device 10 comprises a power supply unit (PSU) 11 for receiving and distributing power (e.g., building power from a power grid, renewable energy source, generator, or battery) and a network interface (e.g., fabric 12, line cards 13). In the example shown in FIG. 1, line card A receives data from outside of the building (e.g., from street or other location) and line cards B, C, and D distribute power and data.

The central hub (combined power and data source) 10 is operable to provide high capacity power from an internal power system (e.g., PSU 11 capable of delivering power over and including 5 kW, 100 kW, etc., and driving the plurality of devices 14, 15, each in the 100 W-3000 W range (e.g., 100 W or greater, 900 W or greater, 1000 W or greater), or any other suitable power range. The PSU 11 may provide, for example, PoE (Power over Ethernet), PoF (Power over Fiber), HVDC (high voltage direct current), pulse power HVDC, or AC (alternating current). The central network device 10 is operable to receive external power and transmit power over combined delivery power and data cables 18 in the communications network (e.g., network comprising central hub 10 (PSE) and a plurality of network devices 14, 15 (PDs)). The central network device 10 may comprise, for example, a router, convergence system, or any other suitable line card system. It is to be understood that this is only an example and any other network device operable to transmit power and optical data may be used. One or more of the line cards 13 may also include an interface module 16 (shown at the remote network devices 14, 15) operable to transmit power and data on the cables 18.

The network may include any number or arrangement of network communications devices (e.g., switches 14, access points 15, routers, or other devices operable to route (switch, forward) data communications). In one example, the network comprises a plurality of groups of access points 15, with each group located on a different floor or zone. One or more of the network devices 14, 15 may also deliver power to equipment using PoE. For example, one or more of the network devices 14, 15 may deliver power using PoE to electronic components such as IP (Internet Protocol) cameras, VoIP (Voice over IP) phones, video cameras, point-of-sale devices, security access control devices, residential devices, building automation devices, industrial automation devices, factory equipment, lights (building lights, streetlights), traffic signals, fog nodes, IoT devices, sensors, and many other electrical components and devices. In one or more embodiments, a redundant central hub (not shown) may provide backup or additional power or bandwidth, as needed in the network. In this case, the remote network device 14, 15 would include another interface module 16 for connection with another cable 18 delivering power and data from the redundant central hub.

As previously noted, the central hub 10 may deliver power and data directly to each network device 14 (point-to-point connection as shown for the switches 14 connected to line cards B and D in FIG. 1) or one or more splitting devices (not shown) may be used to connect a plurality of network devices and allow the network to go beyond point-to-point topologies and build passive stars, busses, tapers, multi-layer trees, etc. For example, a single long cable 18 may run to a conveniently located intermediary splitter device (e.g., passive splitter) servicing a cluster of physically close endpoint devices (e.g., access points 15 connected to line card C in FIG. 1). One or more control systems for the power and data may interact between the central hub 10 and the remote devices 15 (and their interface modules 16) to ensure that each device receives its fair share of each resource from the splitting device, as described in U.S. patent application Ser. No. 15/918,972, referenced above.

Cables (combined cable, multi-function cable, multi-use cable, hybrid cable) 18 extending from the network device 10 to the switches 14 and access points 15 are configured to transmit power and data, and include both optical fibers and electrical wires. The cable 18 may include, for example, two power lines (conductors) and two data lines (optical fibers). It is to be understood that that this is only an example and the cable 18 may contain any number of power or data lines. For example, instead of using two optical fiber paths to transfer data from the central hub 10 to the remote device 14, 15 and from the remote device to the central hub, a bidirectional optical system may be utilized with one wavelength of light going downstream (from central hub 10 to remote device 14, 15) and a different wavelength of light going upstream (from remote device 14, 15 to central hub 10), thereby reducing the fiber count in the cable from two to one. The cable 18 may also include additional optical fibers or power lines. The cables 18 may be formed from any material suitable to carry both electrical power and optical data (e.g., copper, fiber) and may carry any number of electrical wires and optical fibers in any arrangement.

As previously noted, the cables 18 may also carry cooling for thermal management of the remote network communications devices 14, 15. For example, in one or more embodiments, the cables 18 extending from the central hub 10 to the remote network devices 14, 15 may be configured to transmit combined delivery power, data, and cooling in a single cable. In this embodiment, the cables 18 may be formed from any material suitable to carry electrical power, data (e.g., copper, fiber), and coolant (liquid, gas, or multi-phase) and may carry any number of electrical wires, optical fibers, and cooling tubes in any arrangement.

The cables 18 comprise a connector at each end configured to couple with the interface module 16 at the network devices 10, 14, 15. The connector may comprise, for example, a combined power and data connector (hybrid copper and fiber) configured to connect to an optical transceiver, as described in U.S. patent application Ser. No. 15/707,976, referenced above. The connector may comprise, for example, a modified RJ-45 type connector.

In one or more embodiments, the connector and cable 18 are configured to meet standard safety requirements for line-to-ground protection and line-to-line protection at relevant high voltage by means including clearance and creepage distances, and touch-safe techniques. The connector may comprise safety features, including, for example, short-pin for hot-plug and hot-unplug without current surge or interruption for connector arcing protection. The connector may further include additional insulation material for hot-plug and hot-unplug with current surge or interruption with arc-flash protection and reliability life with arcing. The insulated cable power connector terminals are preferably configured to meet touch voltage or current accessibility requirements.

Each network device 10, 14, 15 comprises an interface module 16 (connected to line card 13 at the central network device 10) operable to deliver the combined power and data from the PSE 10 or receive the combined power and data at the PD 14, 15. In one or more embodiments, the interface module 16 may comprise an optical transceiver module configured to deliver (or receive) power along with the optical data. For example, in one embodiment, the interface module 16 comprises a transceiver module modified along with a fiber connector system to incorporate copper wires to deliver power through the optical transceiver to the powered device 14, 15 for use by the network communications devices, as described in U.S. patent application Ser. No. 15/707,976, referenced above or in U.S. patent application Ser. No. 15/942,015 ("Interface Module for Combined Delivery Power, Data, and Cooling at a Network Device"), filed Mar. 30, 2018, which is incorporated herein by reference in its entirety. It is to be understood that these are only examples of interface modules that may be used to deliver or receive high power and optical data.

The interface module 16 (optical module, optical transceiver, optical transceiver module, optical device, optics module, silicon photonics module) is configured to source or receive power. The interface module 16 operates as an engine that bidirectionally converts optical signals to electrical signals or in general as an interface to the network element copper wire or optical fiber. In one or more embodiments, the interface module 16 may comprise a pluggable transceiver module in any form factor (e.g., SFP (Small Form-Factor Pluggable), QSFP (Quad Small Form-Factor Pluggable), CFP (C Form-Factor Pluggable), and the like), and may support data rates up to 400 Gbps, for example. Hosts for these pluggable optical modules include line cards 13 on the central network device 10, switches 14, access points 15, or other network devices. The host may include a printed circuit board (PCB) and electronic components and circuits operable to interface telecommunications lines in a telecommunications network. The host may be configured to perform one or more operations and receive any number or type of pluggable transceiver modules configured for transmitting and receiving signals.

Also, it may be noted that the interface module 16 may be configured for operation in point-to-multipoint or multi-point-to-point topology. For example, QFSP may breakout to SFP+. One or more embodiments may be configured to allow for load shifting. The interface module 16 may also be configured for operation with AOC (Active Optical Cable) and form factors used in UWB (Ultra-Wideband) applications, including for example, Ultra HDMI (High-Definition Multimedia Interface), serial high bandwidth cables (e.g., thunderbolt), and other form factors.

The interface module (optical transceiver) 16 provides for power to be delivered to the switches 14 and access points 15 in locations where standard power is not available. The interface module 16 may be configured to tap some of the energy and make intelligent decisions so that the power source 10 knows when it is safe to increase power on the wires without damaging the system or endangering an operator, as described below. The interface module 16 may include one or more sensors, monitors, or controllers for use in monitoring and controlling the power and data, as described in detail below with respect to FIG. 3.

In one or more embodiments, there is no need for additional electrical wiring for the communications network and all of the network communications devices operate using the power provided by the advanced power over data system. In addition to the network devices 14, 15 comprising interface modules 16 operable to receive and transmit power over electrical wires and optical data over fibers, the network may also include one or more network devices comprising conventional optical modules that only process and transmit the optical data. These network devices would receive electrical power from a local power source such as a wall outlet. Similarly, specialized variants of transceivers 16 may eliminate the optical data interfaces, and only interconnect power (e.g., moving data interconnection to wireless networks). As previously noted, one or more of the network devices may also receive cooling over cable 18 in addition to power, data, or power and data.

In one or more embodiments, a distributed control system comprising components located on the central hub's controller and on the remote device's processor may communicate over the fiber links in the combined cable 18. Monitoring information from power sensors (e.g., current, voltage) or data usage (e.g., bandwidth, buffer/queue size) may be used by the control system in managing or allocating power or data.

As previously noted, the advanced power over data system may be configured to deliver PoE, PoF, high voltage DC (HVDC), AC power, or any combination thereof. The HVDC power may comprise steady state HVDC or pulse power HVDC. The steady state and pulse power HVDC may be unipolar or bipolar (switching DC). In one or more embodiments, the system may employ a dual-power mode that detects and negotiates between the power source 10 and powered device 14, 15, as described below with respect to FIG. 3. This negotiation distinguishes between and accommodates different power-delivery schemes, such as standard PoE or PoF, high power, pulse power, or other power modes capable of power delivery through the interface module 16. For example, standard PoE distribution may be used for remote network devices rated less than about 100 W. For higher power remote powered devices, pulse power or other higher voltage techniques may be used to create an efficient energy distribution network.

The remote network device 14, 15 may use a small amount of power at startup to communicate its power and data requirements to the central network device 10. The powered device 14, 15 may then configure itself accordingly for full power operation. In one example, power type, safety operation of the module, and data rates are negotiated between the central hub 10 and network device 14, 15 through data communications signals on the optical fiber. The interface module 16 communicates any operational fault, including the loss of data. Such fault may result in power immediately being turned off or switching to a low power (low voltage) mode. Full power supply may not be reestablished until the powered device is able to communicate back in low power mode that higher power may be safely applied.

As described in detail below, the advanced power over data system may test the network devices or cables to identify faults or safety issues. In one embodiment, a low voltage power mode may be used during startup (or restart) to test the network and components (as described below with respect to the flowchart of FIG. 4). In another embodiment, testing is performed between high voltage pulses in a pulse power system (as described below with respect to the flowchart of FIG. 5). The off time between pulses may be used for line-to-line resistance testing for faults and the pulse width may be proportional to DC line-to-line voltage to provide touch-safe fault protection (e.g., about 1ms at about 1000V).

The testing (fault detection, fault protection, fault sensing, touch-safe protection) may comprise auto-negotiation between the PSE (central hub 10) and PDs (remote network devices 14, 15). For example, the network may be configured using auto-negotiation before receiving a digital indication (interlock) that it is safe to apply and maintain high power. The auto-negotiation may comprise low voltage sensing of a PD power circuit or cable for line-to-line fault detection (described below with respect to FIGS. 13 and 14). Low voltage (e.g., less than or equal to 12 VDC (volts direct current), 5-12 VDC, or any other suitable low voltage (e.g., >60 VDC)) resistance analysis may be used for auto-negotiation. The pulse power high voltage DC may be used with a pulse-to-pulse decision for touch-safe line-to-line fault interrogation between pulses for personal safety. Line-to-line touch shock protection may be provided with a source pulse off-time between pulses for resistance across line detection between pulses.

Ground-fault-detection (GFD) and ground-fault-isolation (GFI) line-to-ground fault detection may be performed to provide fast high voltage interruption with ground fault protection (shock protection) during high voltage operation as part of using a high-resistance mid-point ground circuit (described below with respect to FIG. 12). A high voltage DC supply line-to-ground fault protection circuit may be used to turn off power quickly to provide touch-safe shock protection. GFD and GFI may provide shut off in approximately 10 μs (microseconds), for example. A midpoint grounding method by the power source may also be used to allow higher peak pulse line-line voltage within the wire/conductor insulation and isolation ratings for line-ground protection and also provide touch-safe line-to-ground fault for personal safety and to meet safety standards. The system may also be designed for adjustable time and current versus voltage for personal shock protection.

The system may be configured to meet safety standards, including, for example, IEC (International Electrotechnical Commission) standard Nos. 62368-3:2017 ("Audio/video information and communication technology equipment—

Part 3: Safety aspects for DC power transfer through communication cables and ports"), IEC 60950-1:2005 ("Information technology equipment—Safety—Part 1: General requirements"), IEC 60947 ("Low-voltage switchgear and controlgear"), or any other applicable standard to provide touch-safe shock protection for personnel for high voltage (higher power) applications in the advanced power over data system. The system may be configured, for example, to limit shock current with line-to-ground fault limit of about 5 mA (e.g., less than 10 mA) and line-to-line fault limit of about 0.5 A for 1 ms using about 2.5 kohms across HVDC power. Appropriate techniques (e.g., fail-safe Safety Agency Approved Listed components, redundant circuits or components) may be employed in order to meet safety standards. The embodiments described herein may be configured to meet single fault protection or other safety requirements. It is to be understood that the standards and limits discussed herein are only provided as examples and other safety limits or standards may be used, without departing from the scope of the embodiments.

It is to be understood that the network devices and topology shown in FIG. 1, and described above is only an example and the embodiments described herein may be implemented in networks comprising different network topologies or network devices, without departing from the scope of the embodiments. For example, the network may comprise any number or type of network communications devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable connection, which provides a viable pathway for electronic communications along with power.

Figure 2:
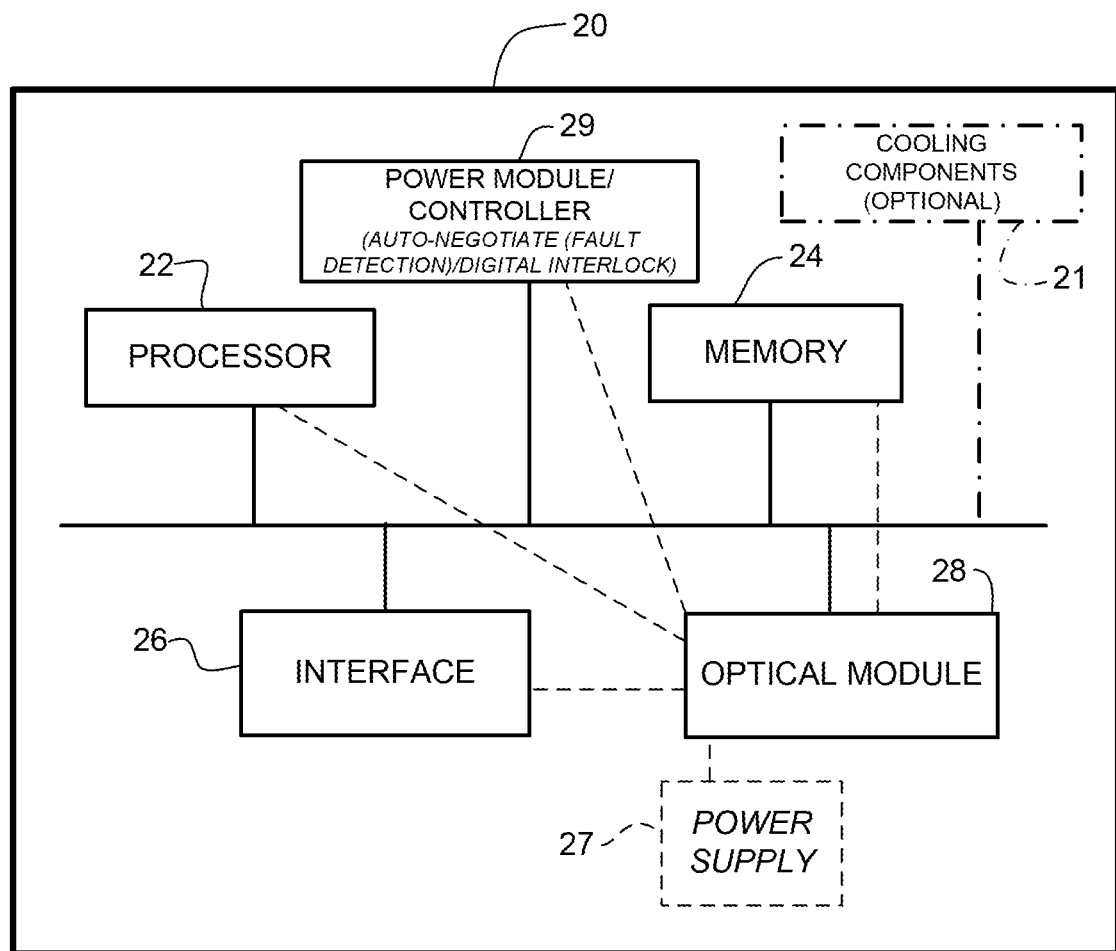
FIG. 2 depicts an example of a network device useful in implementing embodiments described herein.

FIG. 2 illustrates an example of a network device 20 (e.g., central hub 10, switch 14, access point 15 in FIG. 1) that may be used to implement the embodiments described herein. In one embodiment, the network device 20 is a programmable machine that may be implemented in hardware, software, or any combination thereof. The network device 20 includes one or more processors 22, memory 24, interface 26, optical module 28 (e.g., power+optics interface module 16 in FIG. 1), and power module (controller) 29. The network device may also comprise one or more cooling components 21 (sensors, control valves, pumps, etc.) if the system is configured for combined power, data, and cooling delivery.

Memory 24 may be a volatile memory or non-volatile storage, which stores various applications, operating systems, modules, and data for execution and use by the processor 22. For example, components of the optical module 28 (e.g., code, logic, or firmware, etc.) may be stored in the memory 24. The network device 20 may include any number of memory components.

The network device 20 may include any number of processors 22 (e.g., single or multi-processor computing device or system), which may communicate with a forwarding engine or packet forwarder operable to process a packet or packet header. The processor 22 may receive instructions from a software application or module, which causes the processor to perform functions of one or more embodiments described herein. The processor 22 may also operate one or more components of the power control module 29 for fault detection, auto-negotiation, digital interlock, etc. The control system may comprise components (modules, code, software, logic) located at the central hub 10 and the remote device 14, 15, and interconnected through the combined power and data cable 18 (FIGS. 1 and 2). The control system may also receive input from power sensors or data monitoring devices, as described below with respect to FIG. 3. The power module 29 may communicate with the control system at the central network device 10 to auto-negotiate the status of the power system, identify any faults in the power system (e.g., cables or powered device), and select a power operating mode. As previously noted, the auto-negotiation may be performed during a low voltage startup or between pulses in a pulse power system. One or more control system or power module components may be located at the optical module 28.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowcharts of FIGS. 4 and 5. The network device 20 may include any number of processors 22.

The interface 26 may comprise any number of network interfaces (line cards, ports, connectors) for receiving data or power, or transmitting data or power to other devices. The network interface may be configured to transmit or receive data using a variety of different communications protocols and may include mechanical, electrical, and signaling circuitry for communicating data over physical links coupled to the network interfaces. For example, line cards may include port processors and port processor controllers. The interface 26 may also comprise fluid ports if the system is configured for cooling. One or more of the interfaces 26 may be configured for PoE+F+C (Power over Ethernet+Fiber+Cooling), PoE+F, PoE, PoF, or similar operation.

The optical module 28 may include logic, firmware, software, etc. for use in monitoring or controlling the advanced power over data system, as described below. For example, the optical module 28 may comprise hardware or software for use in power detection, power monitor and control, or power enable/disable. The optical module 28 may further comprise one or more of the processor or memory components, or interface 26 for receiving or delivering power and data. As previously described, power is supplied to the optical module by power supply 27 and the optical module 28 provides power to the rest of the components at the network device 20.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
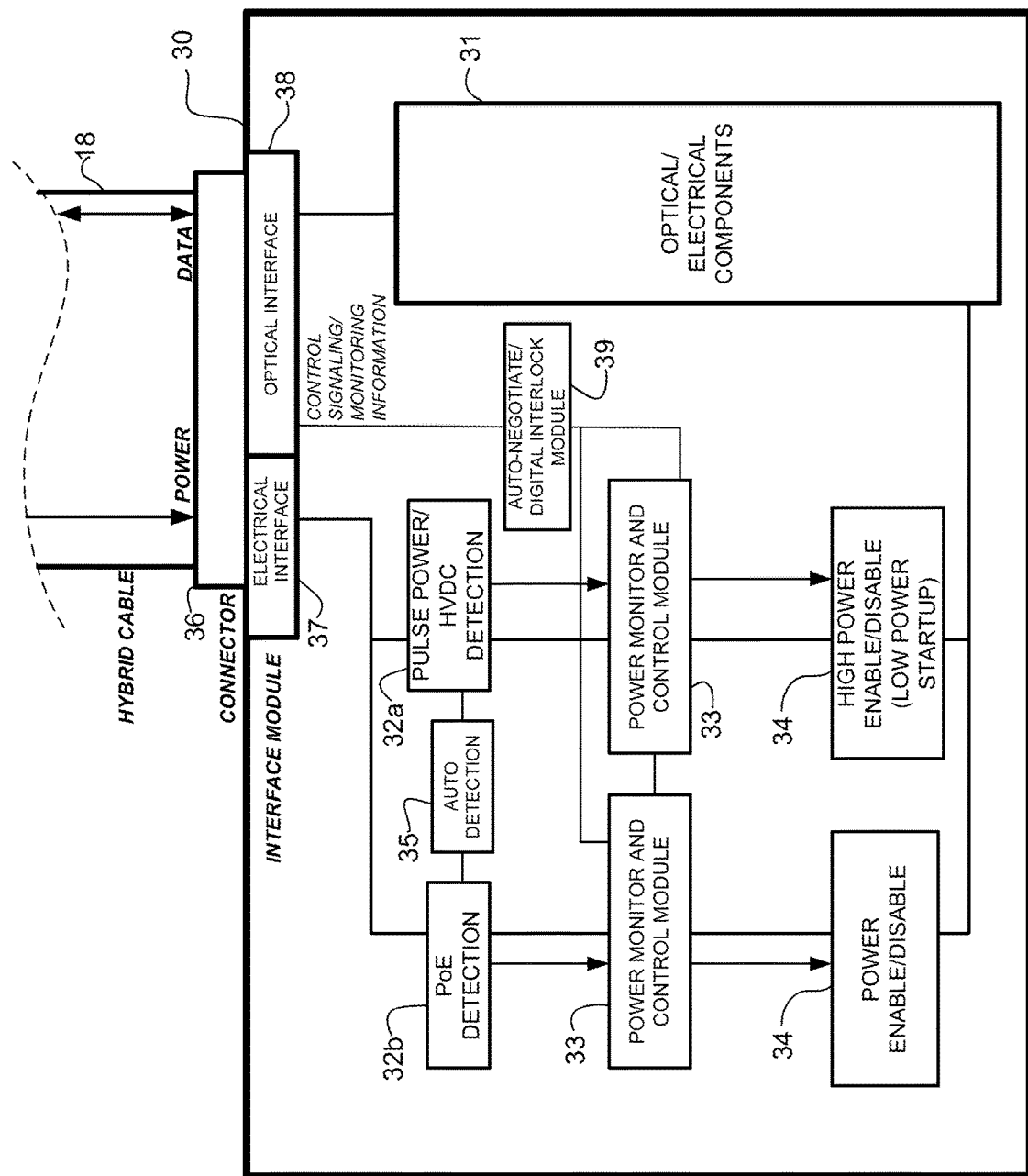
FIG. 3 is a block diagram illustrating components of a power safety and fault protection system, in accordance with one embodiment.

FIG. 3 is a block diagram illustrating components for use in power monitor and control, auto-negotiation, and fault protection at a network device 30, in accordance with one embodiment. One or more of the components shown in FIG. 3 may be located at the interface module 16 or in communication with one or more components of the interface module (FIGS. 1 and 3). The cable 18 carrying the high power and data is shown with cable connector 36 coupled to the interface module in FIG. 3. The power is received at an electrical interface 37 and the data is received and transmitted at an optical interface 38. Connector 36 may comprise a single physical component or a single component with modular parts for each function, for example.

The network device 30 includes optical/electrical components 31 for receiving optical data and converting it to electrical signals (or converting electrical signals to optical data) and power components including, power detection modules 32a, 32b, power monitor and control modules 33, and power enable/disable modules 34. Although PoE and pulse power are described in conjunction with detection elements 32a, 32b, it should be understood that other power delivery schemes including AC, DC, and USB may be supported with similar elements. The power components may be isolated from the optical components 31 via an isolation component (e.g., isolation material or element), which electromagnetically isolates the power circuit from the optical components to prevent interference with operation of the optics. The network device 30 includes an auto detection module 35 that operates with the pulse power detection module 32a and PoE detection module 32b. One or more functions of the detection elements 32a, 32b, auto detection module 35, power monitor and control modules 33, or auto-negotiation module 39 (described below) may be combined into a power module and operate within the interface module.

The auto-negotiate/digital interlock module 39 may be used in performing one or more fault detection, auto-negotiation, or digital interlock processes described herein. As described in detail below, auto-negotiation may include communication between the central network device and the remote network device and interaction between controllers at the central network device and remote network device. One or more control signals or monitoring information may be transmitted over the data line (e.g., optical fibers) in the combined power and data cable 18 to provide an operating status (e.g., fault/no fault) of the network device, cable, or power circuit.

In the example shown in FIG. 3, each module 32a, 32b is in communication with its own power monitor and control module 33 and power enable/disable module 34. The circuit detects the type of power applied to the network device 30, determines if PoE or pulsed power is a more efficient power delivery method, and then uses the selected power delivery mode. As noted above, additional modes may support other power+data standards (e.g., USB (Universal Serial Bus)).

The network device 30 is configured to calculate available power and prevent the cabling system from being energized when it should not be powered. The power monitor and control modules 33 continuously monitor power delivery to ensure that the system can support the needed power delivery and no safety limits (e.g., voltage, current) are exceeded. The power monitor and control modules 33 may also monitor optical signaling and disable power if there is a lack of optical transitions or communication with the power source. Power monitor and control functions may sense the voltage and current flow, and report these readings to a central control function. In one embodiment, the network device 30 uses a small amount of power (e.g., ≤12V, ≤60V) at startup or restart to communicate its power and data requirements and status. The network device 30 may then be configured for full power operation (e.g., >60V, ≥500V, ≥1000V) (e.g., at high power enable/disable module 34) if no faults or safety conditions are detected. If a fault is detected, full power operation may not be established until the network device communicates in low power mode that high power can be safely applied. As described below, the auto-negotiate (fault detection module) 39 may be used to test the network and components for touch-safe interrogation between pulses in a pulse power system or during a low voltage startup mode. The auto-negotiation module 39 communicates with a control system at the central network device to select a safe operating mode (e.g., determine that it is safe to apply high voltage power), identify a fault in the circuit (e.g., line-to-line or line-to-ground fault detection), and shutdown power if a fault is identified.

Figure 4:
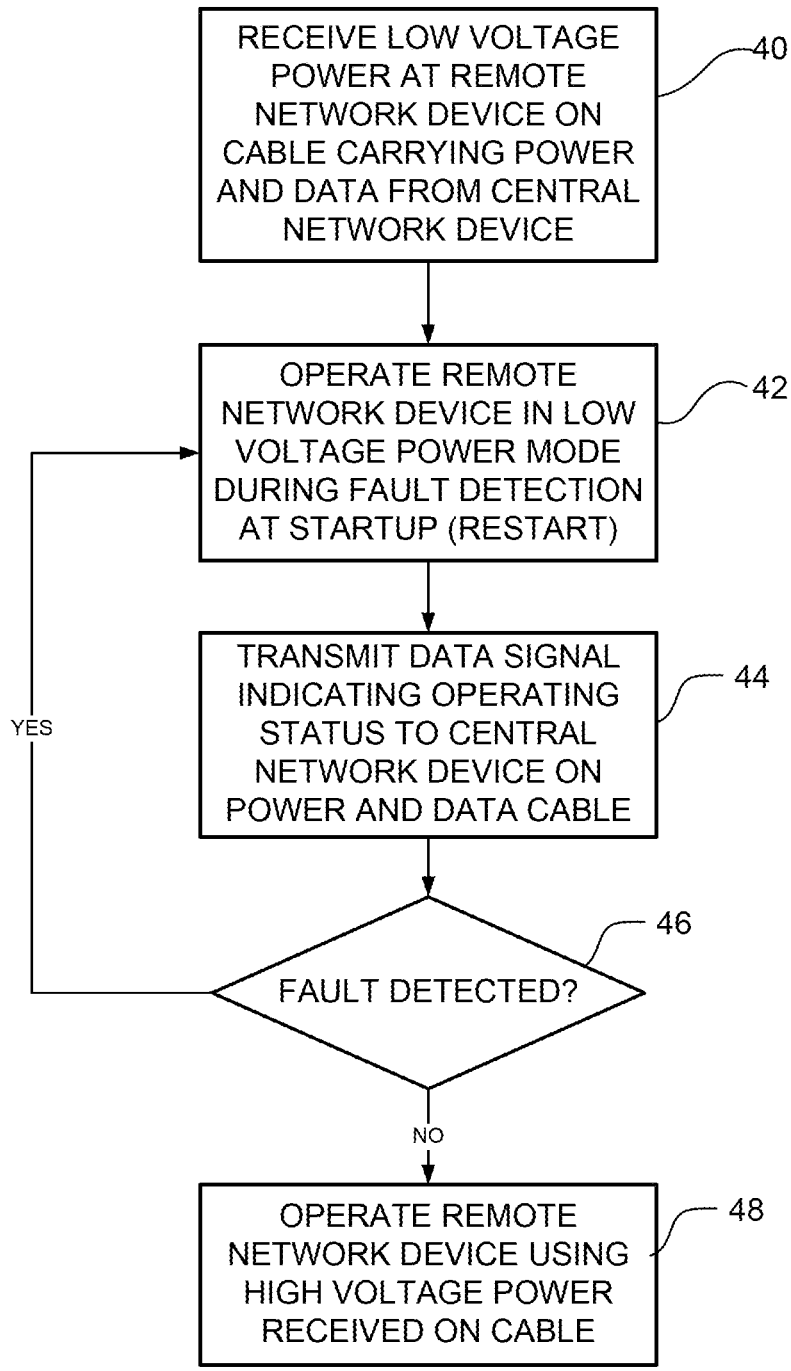
FIG. 4 is a flowchart illustrating an overview of a process for low voltage startup with fault detection and digital interlock in a combined power and data delivery system, in accordance with one embodiment.

FIG. 4 is a flowchart illustrating an overview of an auto-negotiation startup process with safety interlock, in accordance with one embodiment. At step 40, a remote network device (e.g., switch 14 in FIG. 1) receives combined delivery power and data from a central network device (e.g., combined power and data source 10 in FIG. 1). The power is received at an optical transceiver module 16. The remote network device 14 operates in a low voltage startup mode during fault sensing (detection) at the remote network device (step 42). The low voltage mode may be, for example, ≤12V (volts), for example. The fault sensing may be performed to check the operational status of a power circuit extending between the central network device 10 over the combined delivery cable 18 to the remote network device 14. As described below, the fault sensing may be performed using control circuits at the remote network device 14, central network device 10, or both network devices. The remote network device 14 transmits a data signal to the central network device 10 over the combined delivery cable 18 indicating an operating status based on the fault sensing (step 44). This may include, for example, an auto-negotiation process (auto-negotiating) performed between the central network device 10 and remote network device 14. If no faults are present at the network device, the remote network device converts to high power operation and a digital interlock is set between the central network device 10 and remote network device 14 (steps 46 and 48). The high power operation may comprise, for example, power ≥100V, ≥500V, about 1000V (differential voltage), ≥100 W, about 1000 W (load power), or any other suitable high power. The remote network device 14 receives high voltage power from the central network device 10 on the cable 18 upon transmitting an indication of a safe operating status at the remote network device, and the network device is powered by the high voltage power. If a fault is detected, the process may be repeated after a specified interval or for a specified number of times to determine if there was an error in the testing or a fault is still present in the power circuit. As described below with respect to FIG. 5, a pulse load current may be applied at the remote network device 14 and fault detection performed between pulses after the startup process is performed.

Figure 5:
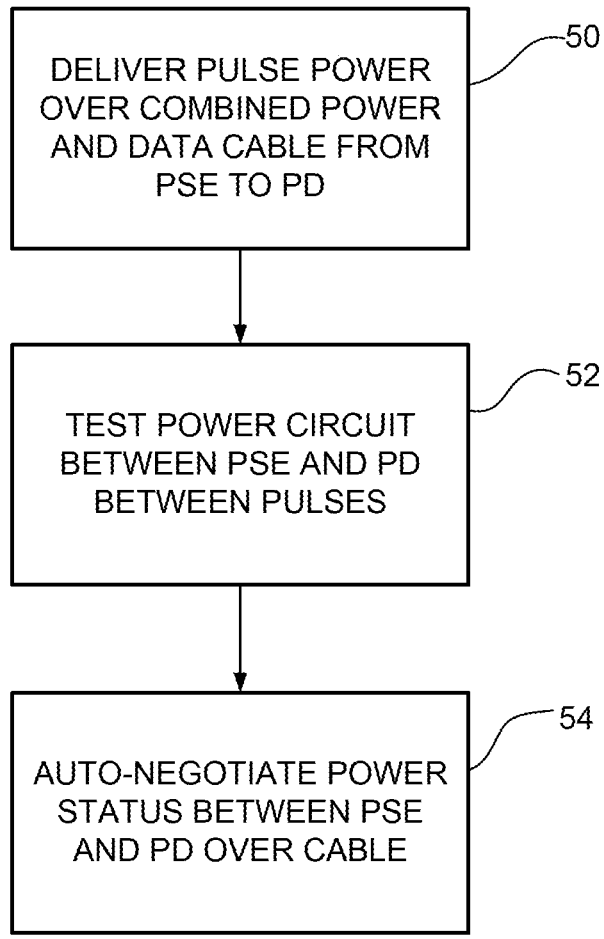
FIG. 5 is a flowchart illustrating an overview of a process for pulse power with fault detection between pulses in a combined power and data delivery system, in accordance with one embodiment.

FIG. 5 illustrates an overview of a fault protection process using fault sensing between power pulses in a combined delivery power and data system, in accordance with one embodiment. At step 50 a PSE (e.g., central hub 10 in FIG. 1) delivers high voltage direct current (HVDC) pulse power to a powered device (e.g., remote network device 14 in FIG. 1) over a cable 18 delivering power and data. A power circuit between the PSE and PD is tested between pulses (step 52). The PSE communicates with the PD over the cable to identify an operating mode at the PD 14 based on the testing (step 54). If no faults are detected, the PD 14 operates with HVDC pulse power and the process continues with fault detection and auto-negotiation performed between pulses. If a fault is detected, power to the PD may be shut-off or the PD may switch to a low power mode. As described below, the pulse power may be HVDC load pulse power (FIGS. 6 and 7), source unipolar pulse power (FIGS. 8 and 9), or source bipolar (switched) power (FIGS. 10 and 11).

It is to be understood that the processes shown in FIGS. 4 and 5 and described above are only examples and that steps may be added, modified, removed, or combined, without departing from the scope of the embodiments.

Figure 6:
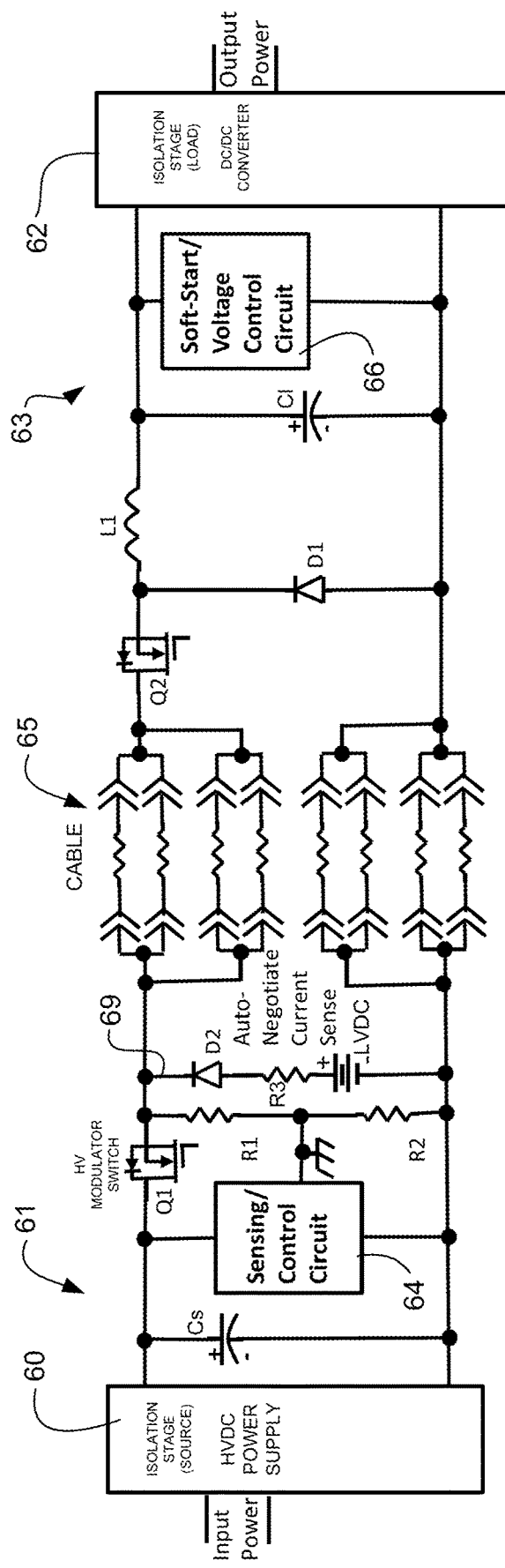
FIG. 6 is a diagram illustrating a circuit for use with pulse load current and auto-negotiation, in accordance with one embodiment.
Figure 7:
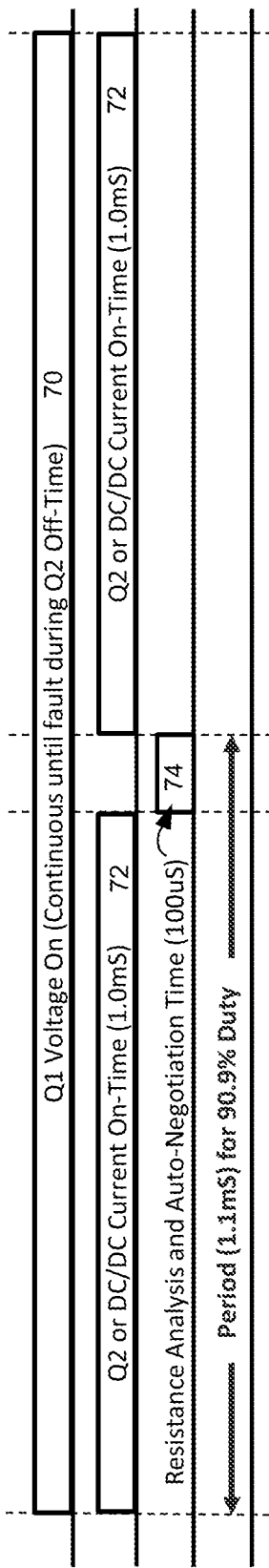
FIG. 7 is a timing diagram for the circuit shown in FIG. 6, in accordance with one embodiment.
Figure 8:
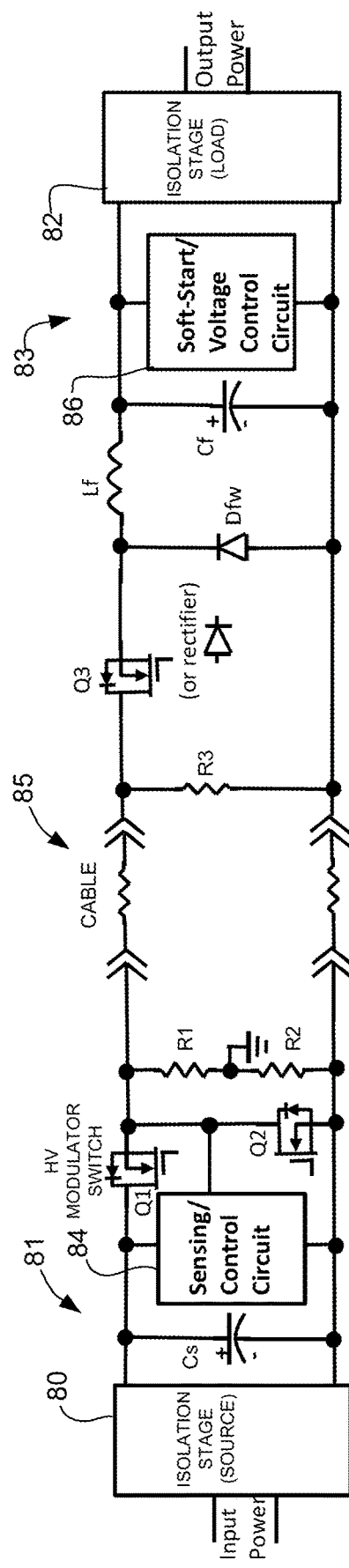
FIG. 8 is a diagram illustrating a circuit for use with unipolar pulse power and auto-negotiation, in accordance with one embodiment.
Figure 9:
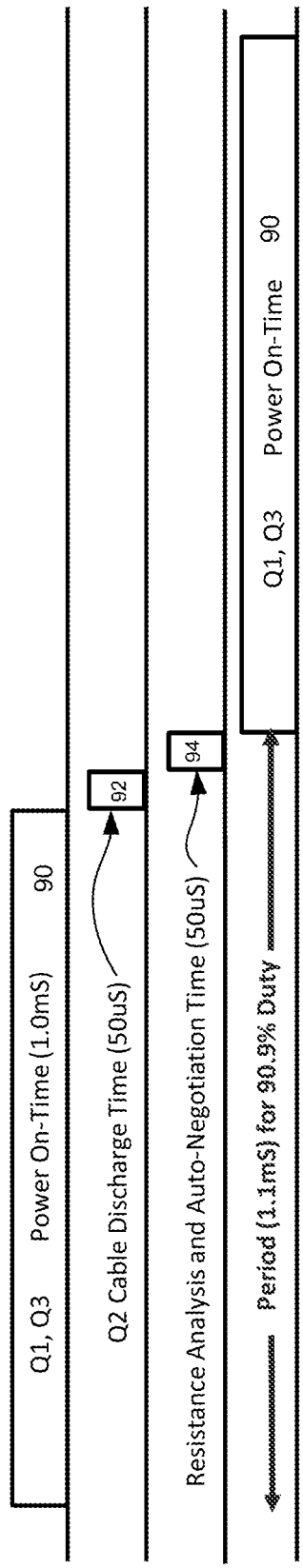
FIG. 9 is a timing diagram for the circuit shown in FIG. 8, in accordance with one embodiment.
Figure 10:
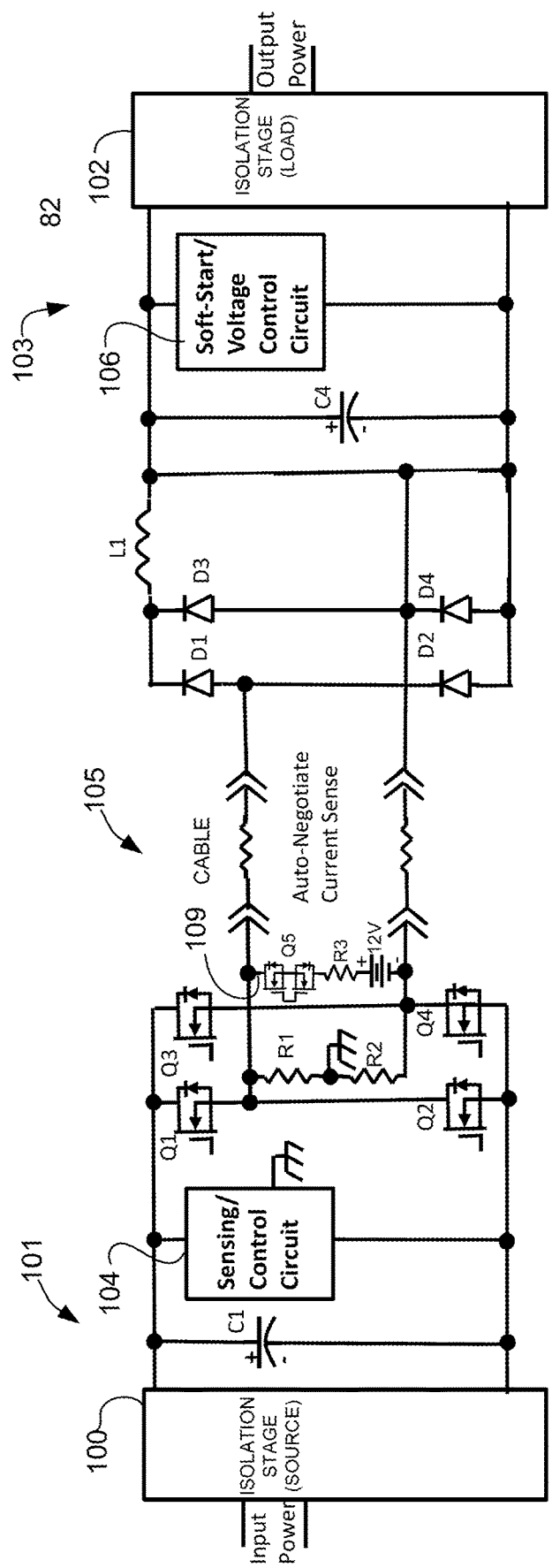
FIG. 10 is a diagram illustrating a circuit for use with bipolar pulse power and auto-negotiation, in accordance with one embodiment.
Figure 11:
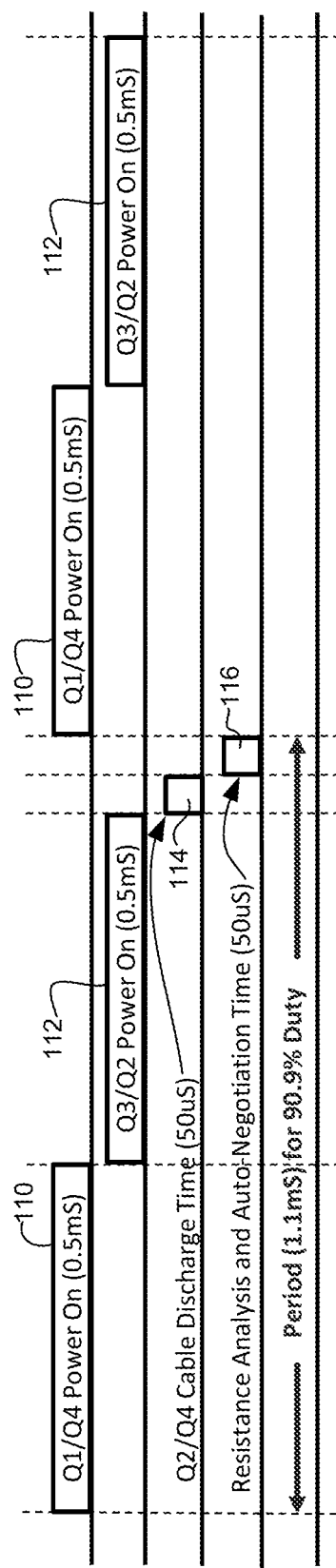
FIG. 11 is a timing diagram for the circuit shown in FIG. 10, in accordance with one embodiment.

FIGS. 6, 8, and 10 illustrate examples of circuits that may be used for fault detection with pulse power in the advanced power over data system described herein. FIG. 6 illustrates a circuit that may be used with HVDC pulse load current with off-time auto-negotiation and shut-down for touch-safe protection. FIGS. 8 and 10 illustrate circuits that may be used with HVDC unipolar source pulse power and HVDC bipolar source pulse power, respectively, with cable discharge pulse and open circuit off-time fault sensing and auto-negotiation. FIGS. 7, 9, and 11 illustrate timing examples for auto-negotiation in the circuits shown in FIGS. 6, 8, and 10, respectively. As previously described, a low voltage startup process may be performed to check for faults at startup before pulse power is applied and auto-negotiation is performed between pulses. The low voltage testing (at startup or between pulses) may include low voltage line-to-line sensing, as described below with respect to FIGS. 13 and 14. In addition to the low voltage sensing, a high voltage, line-to-ground test may be performed, as described below with respect to FIG. 12.

FIG. 6 illustrates a circuit for use with HVDC pulse load current with off-time auto-negotiation, in accordance with one embodiment. The input power is received at an isolation stage 60 at the PSE, generally indicated at 61, and output power is delivered at an isolation stage 62 at the PD, generally indicated at 63. The PSE 61 provides power to the PD 63 over a combined power and data cable, generally indicated at 65, which in this example comprises a 4 pair cable (e.g., 100 m, 4 pair cable, or any other suitable cable configured to deliver high voltage power and data). The PSE 61 may provide, for example, regulated or unregulated 550 VDC with a 1 KW load and +/−275 VDC power (e.g., about 1042 W, 543V, 1.92 A at the PD 63). The steady state power may be unipolar or bipolar. It is to be understood that the power, voltage, current values, and cable described herein are only provided as examples and that high voltage power may be provided at different power levels or other cable configurations may be used over different distances without departing from the scope of the embodiments.

As shown in FIG. 6, the PSE 61 includes a sensing/control circuit 64 and the PD 63 includes a soft-start/voltage control circuit 66. The soft-start/voltage control circuit 66 may be used, for example, to limit the voltage applied at the powered device during startup. The PSE 61 further comprises a PSE modulator switch Q1, source capacitor Cs, resistors R1, R2, R3 and auto-negotiate current sense circuit 69. The PD 63 portion of the power circuit comprises a load capacitor C1, diode D1, inductor L1, and PD isolation modulator switch Q2. Switches Q1, Q2 may comprise, for example, a solid state switch or any other suitable device. In one example, PSE switch Q1 is switched on to provide continuous HVDC power unless a fault is detected during auto-negotiation of cable resistance when PD isolation switch Q2 is switched off, as described below with respect to the timing diagram shown in FIG. 7.

It is to be understood that the circuit shown in FIG. 6 is only an example and that other arrangements or combinations of components (e.g., resistors (R1, R2, R3), capacitors (Cs, Cl), diodes (D1, D2), inductor (L1), switches (Q1, Q2), or number of pairs in cable) may be used without departing from the scope of the embodiments.

FIG. 7 illustrates an example of a timing diagram for auto-negotiation in the circuit of FIG. 6, in accordance with one embodiment. As shown in FIG. 7, Q1 voltage is on and continuous (as indicated at 70) until a fault is detected during Q2 off-time. In this example, Q2 on-time (72) is 1.0 ms (millisecond). The resistance analysis and auto-negotiation time (74) is 100 μs (microsecond). If no faults are identified during the analysis and auto-negotiation period 74, the cycle is repeated with Q2 on for 1.0 ms (72). In this example, the period covers 1.1 ms with a 90.9% duty cycle.

In another example, PSE switch Q1 in FIG. 6 may be switched on for a high voltage pulse (e.g., for 1 ms) and switched off (e.g., for 100 μs) for auto-negotiation of cable resistance with PD isolation switch Q2 off. Voltage may be measured across the capacitors Cs, Cl during testing. When the switches Q1, Q2 are turned off (circuit open), the voltage across the capacitor Cl will decay as it is discharged through the resistor. If the voltage decays too quickly or too slowly, a fault may be present. Calculated line resistance may also be used and compared to a specified value to determine if there is a fault in the power circuit (cable, PSE, or PD). In one example, R1 and R2 may be rated at 560 kohms each and the auto-negotiate current sense circuit 69 may comprise a 220 kohm resistor R3 and 12V power. It should be noted that these values are only provided as examples and other resistance or voltage values may be used.

FIG. 8 shows a circuit for use with HVDC unipolar source pulse power, in accordance with one embodiment. The system provides cable discharge pulse and open circuit off-time fault sensing line-to-ground or line-to-line abnormal resistance auto-negotiate for touch-safe protection. As described above with respect to FIG. 6, the input power is received at an isolation stage 80 of the PSE, generally indicated at 81, and power is output from an isolation stage 82 at the PD, generally indicated at 83. The source 80 operates as both a low voltage source for startup (e.g., 56 VDC or other low voltage (≤60 VDC)) and a high voltage source (e.g., 250-550 VDC) for pulsing with switch Q1 operating as a modulator. The PSE 81 and PD 83 communicate over a combined high power and data cable, generally indicated at 85. The PSE 81 includes a sensing/control circuit 84 and the PD 83 includes a soft-start/voltage control circuit 86. The sensing control circuit 84 may include touch-safe circuits for line-to-line shock with low voltage (e.g., about 12-56V) and measures resistance at the PD as an interlock connection to enable high voltage startup and auto-negotiation between pulses with touch shock protection (e.g., 1-10 kohm) that inhibits the next high voltage pulse. The sensing circuit 84 may also include touch-safe circuits for line-to-ground shock with high resistance midpoint ground unbalance that inhibits high voltage during pulse.

As shown in FIG. 8, the PSE 81 comprises switches Q1 and Q2, capacitor Cs, and resistors R1 and R2. Cable discharge transistor Q2 may incorporate controlled turn-on or other means to limit peak discharge current and cable ringing. In one example, the PSE 81 provides 1000 VDC for a 1 kW load at the PD 83 with +1.1 kV pulse power. The PD circuit comprises a capacitor Cf, diode Dfw, inductor Lf, resistor R3 (for PD connection resistor detect), and switch Q3. Switch Q3 may provide soft-start, off-time isolation, and regulation. In one example, resistors R1 and R2 comprise 560 kohms resistors and R3 is a 100 kohm resistor.

It is to be understood that the circuit shown in FIG. 8 is only an example and that other arrangements or combinations of components (e.g., resistors (R1, R2, R3), capacitors (Cs, Cf), diode (Dfw), inductor (Lf), or switches (Q1, Q2, Q3)) may be used without departing from the scope of the embodiments. Also, different resistance or voltage values may be used.

FIG. 9 shows a timing diagram with a 1.0 ms-on/0.1 ms-off duty cycle for the circuit shown in FIG. 8. Q1 and Q3 power on-time in this example is 1.0 ms (indicated at 90). The Q2 cable discharge time (92) is 50 μs and the resistance analysis and auto-negotiation time (94) is 50 μs. This period is repeated every 1.1 ms for a 90.9% duty cycle.

FIG. 10 illustrates a circuit for use with HVDC bipolar pulse power in accordance with one embodiment. The system provides cable discharge pulse open circuit off-time fault sensing line-to-line or line-to-ground abnormal resistance auto-negotiate for touch-safe protection, The circuit includes isolation stage 100 at the PSE, generally indicated at 101, and isolation stage 102 at the PD, generally indicated at 103. The PSE 101 and PD 103 are in communication over combined power and data cable, generally indicated at 105. In one example, the current may be limited to about 1-1.2 amps to allow use of a 4-pair cable. The PSE 101 comprises a sensing/control circuit 104 and the PD 103 includes a soft-start/voltage control circuit 106, as previously described. The PSE 101 comprises switches Q1, Q2, Q3, Q4 that may be used to provide a low voltage startup or fault detection between pulses, as described below with respect to FIG. 11. The PSE power circuit further includes resistors R1, R2 (e.g., 560 kohm or any other suitable resistance), and an auto-negotiate current sense circuit 109, which may provide resistance (R3) (e.g., 220 kohm or other suitable resistance) and 12V (low voltage) power. In the example shown in FIG. 10, the low voltage auto-negotiate current sense circuit further includes a high voltage blocking switch (Q5).

It is to be understood that the circuit shown in FIG. 10 is only an example and that other arrangements or combinations of components (e.g., resistors (R1, R2, R3), capacitors (C1, C2, C3, C4), diodes (D1, D2, D3, D4), inductors (L1, L2), and switches (Q1, Q2, Q3, Q4, Q5) may be used without departing from the scope of the embodiments.

FIG. 11 illustrates a timing diagram for the circuit shown in FIG. 10, in accordance with one embodiment. Q1/Q4 power is on for 0.5 ms (110) and Q3/Q2 power is on for 0.5 ms (112). Q2/Q4 cable discharge time (114) is 50 μs and resistance analysis and auto-negotiation time (116) is 50 μs. The 1.1 ms time period is repeated for a 90.9% duty cycle.

It is to be understood that the timing diagrams shown in FIGS. 7, 9, and 11 are only examples and that the timing or duty cycle may be different than shown without departing from the scope of the embodiments. For example, the pulse power duty cycle may be between 90% and 95%.

Figure 12:
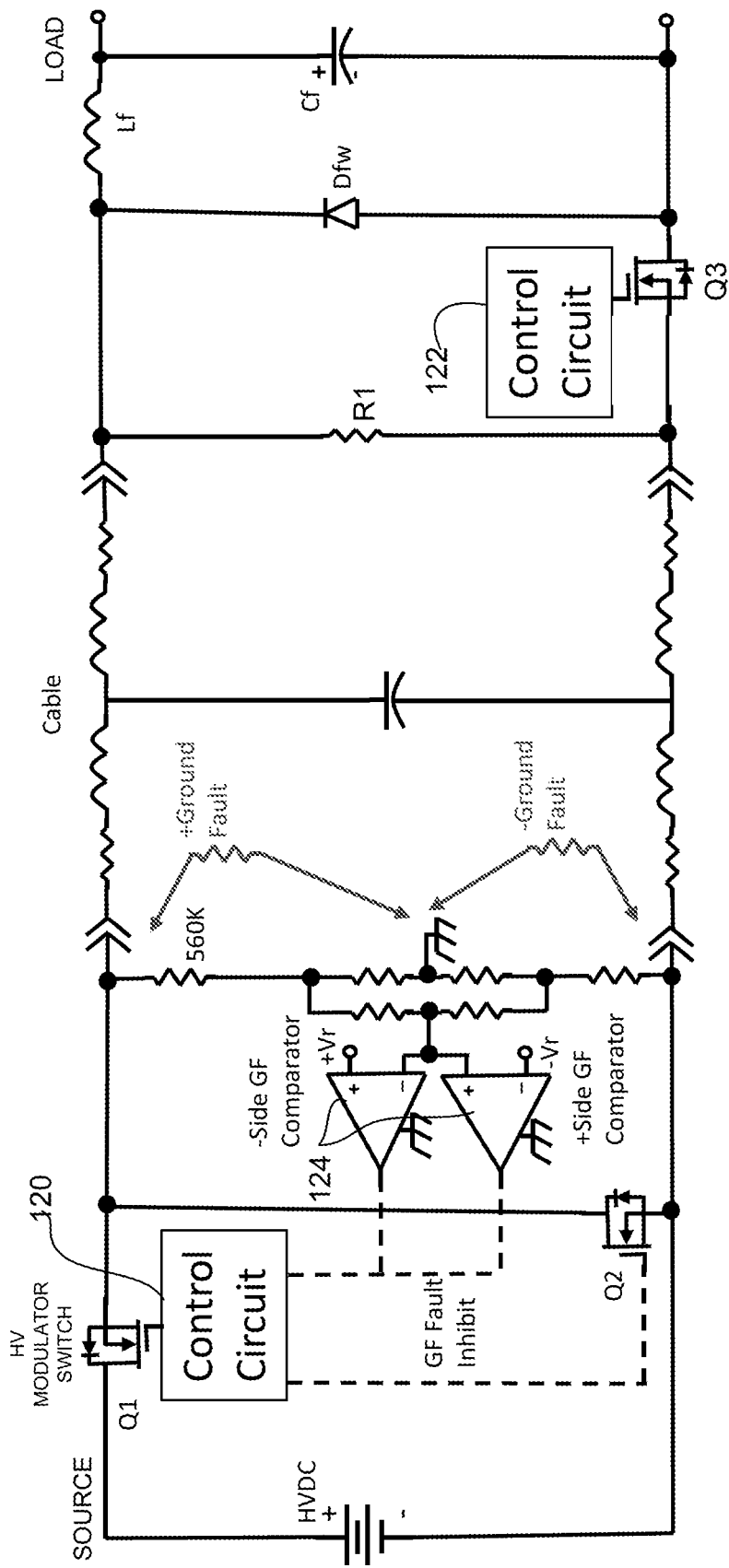
FIG. 12 is a diagram illustrating line-to-ground fault detection, in accordance with one embodiment.
Figure 13:
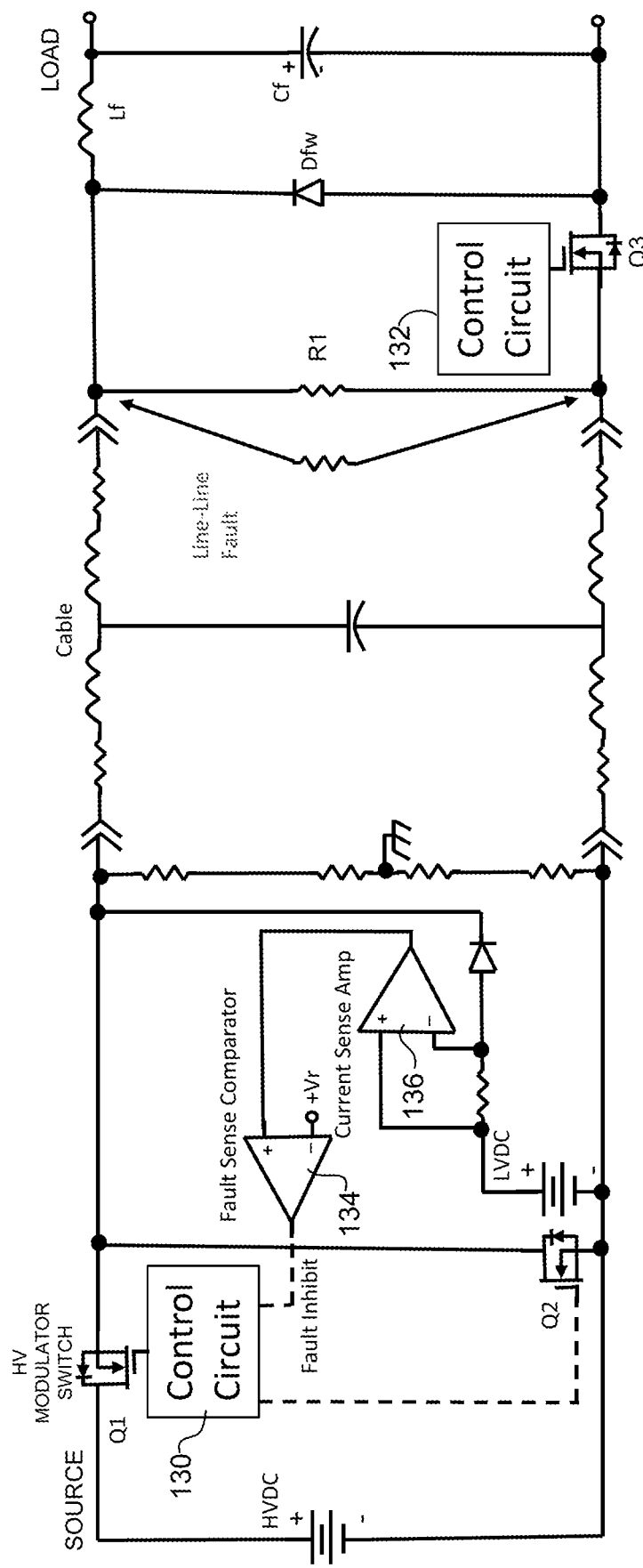
FIG. 13 is a diagram illustrating line-to-line fault detection, in accordance with one embodiment.

FIGS. 12-13 illustrate examples of touch-safe protection from line-to-ground (FIG. 12) and line-to-line (FIGS. 13 and 14) electrical shock. In one or more embodiments, a midpoint grounding line-ground (GFI/GFD) shock protection sensing circuit may be used during high voltage operation. Line-to-ground (GFI/GFD) fault sensing may also be provided during low voltage operation to prevent a high voltage pulse. In one or more embodiments, high voltage pulse power is only allowed after auto-negotiation of safe PD connection (e.g., secure with PD resistance value of about 100 kohms) and no line-to-line body resistance fault (e.g., less than about 8 kohms at startup and for next high voltage pulse). This minimizes the chance for any contact with exposed electrical contacts. The short high voltage pulse time before another auto-negotiation period between high voltage pulses mitigates the risk of high unsafe currents and electric shock danger.

FIG. 12 illustrates line-to-ground fault detection, in accordance with one embodiment. In one example, the PSE provides source regulated or unregulated HVDC (e.g., 550 VDC) and the PD has load regulated HVDC (e.g., 215 VDC). The PSE and PD are connected over a combined delivery power and data cable, as previously described. The line-to-ground fault detection may be used with continuous power or with pulse power when the high voltage is on. Fast high voltage interruption is provided with ground fault protection (shock protection) during high voltage. In one example, 800 k-1.4 k-8 kohms body resistance at 550 VDC for about 1 mA, results in an interrupt in <1 ms. A PSE control circuit 120 controls a PSE pulse modulator switch Q1, PSE cable discharge switch Q2, and GF (ground fault) comparators 124. PD control circuit 122 controls converter isolation switch Q3 that has an initial low voltage startup delay before turn-on with the low voltage power, or wait for the first high voltage pulse to startup. The PD DC/DC converter isolation switch Q3 isolates the DC/DC converter high and low voltages from the low voltage auto-negotiation line-to-line circuit sensing the cable circuit resistance for safe PD connection and no low resistance of a body resistance fault. This switch circuit may include operation as a soft-start inrush control, reverse polarity protection and also as a PWM (pulse-width modulation) voltage controller. The PD power circuit also includes a PD connection resistor detect resistor R1.

Figure 14:
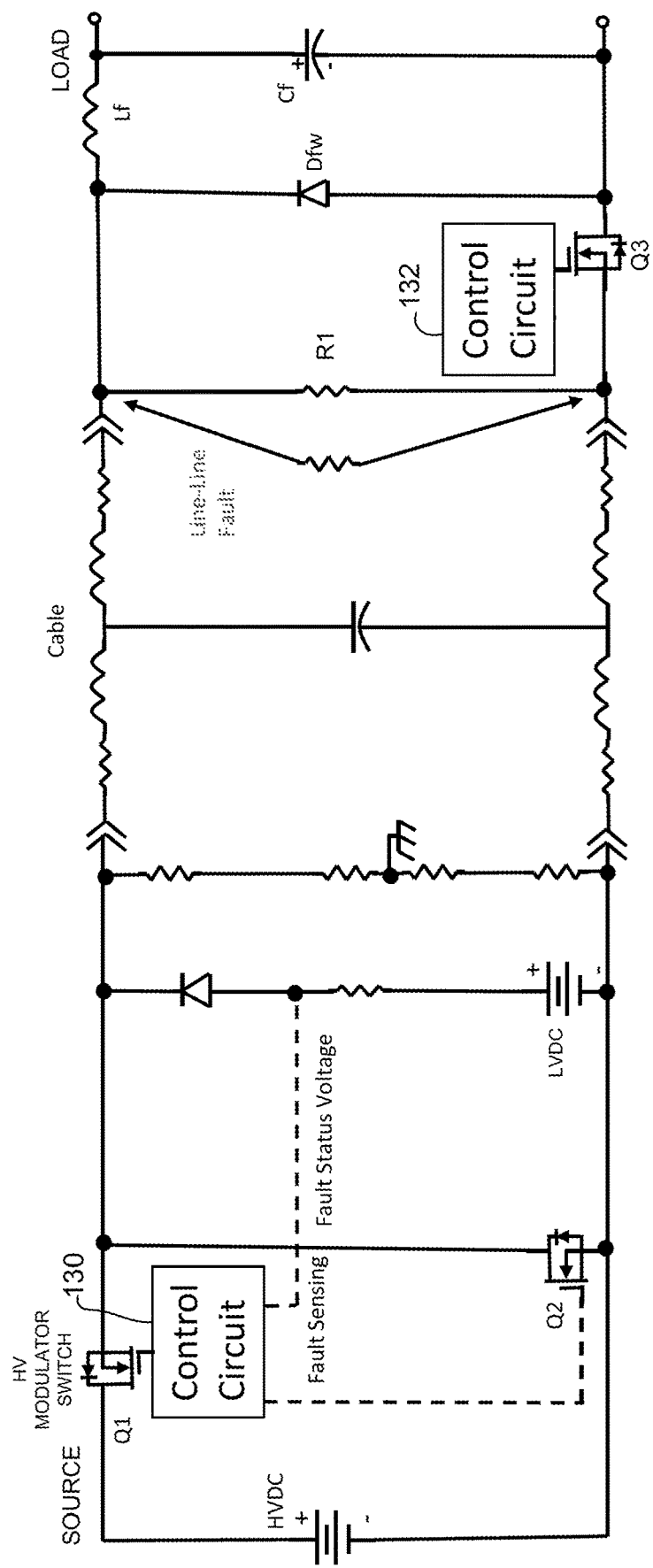
FIG. 14 is a diagram illustrating line-to-line fault detection, in accordance with another embodiment.

FIGS. 13 and 14 illustrate two examples of circuits for use in line-to-line fault detection. High voltage touch-safe protection is provided for line-to-line shock for pulse power applications while low voltage is on between high voltage pulses or low power mode during startup. For example, during startup auto-negotiation may be performed using sensing of PD connection with correct resistor detection. Low voltage auto-negotiation may also be performed for line-to-line fault protection (shock protection) before next high voltage pulse. In one example, 800 k-1.4 k-8 kohms body resistance is assumed during low voltage test before next pulse. The circuits shown in FIGS. 13 and 14 each include control circuits 130, 132 at the PSE and PD, respectively. In the circuit shown in the example of FIG. 13, a fault sense comparator 134 and current sense amplifier 136 are used in line-to-line fault detection at the PSE. In the circuit shown in the example of FIG. 14, fault sensing is performed to identify an open cable (e.g., about 11.1V), cable to PD fault (e.g., about 6.5V), or body fault (e.g., less than about 1.8V). The PSE circuit includes a PSE pulse modulator switch Q1 and PSE cable discharge switch Q2. The PD circuit includes PD DC/DC converter isolation switch Q3 and resistor R1 for use in PD connector resistor detection, as previously described.

Figure 15:
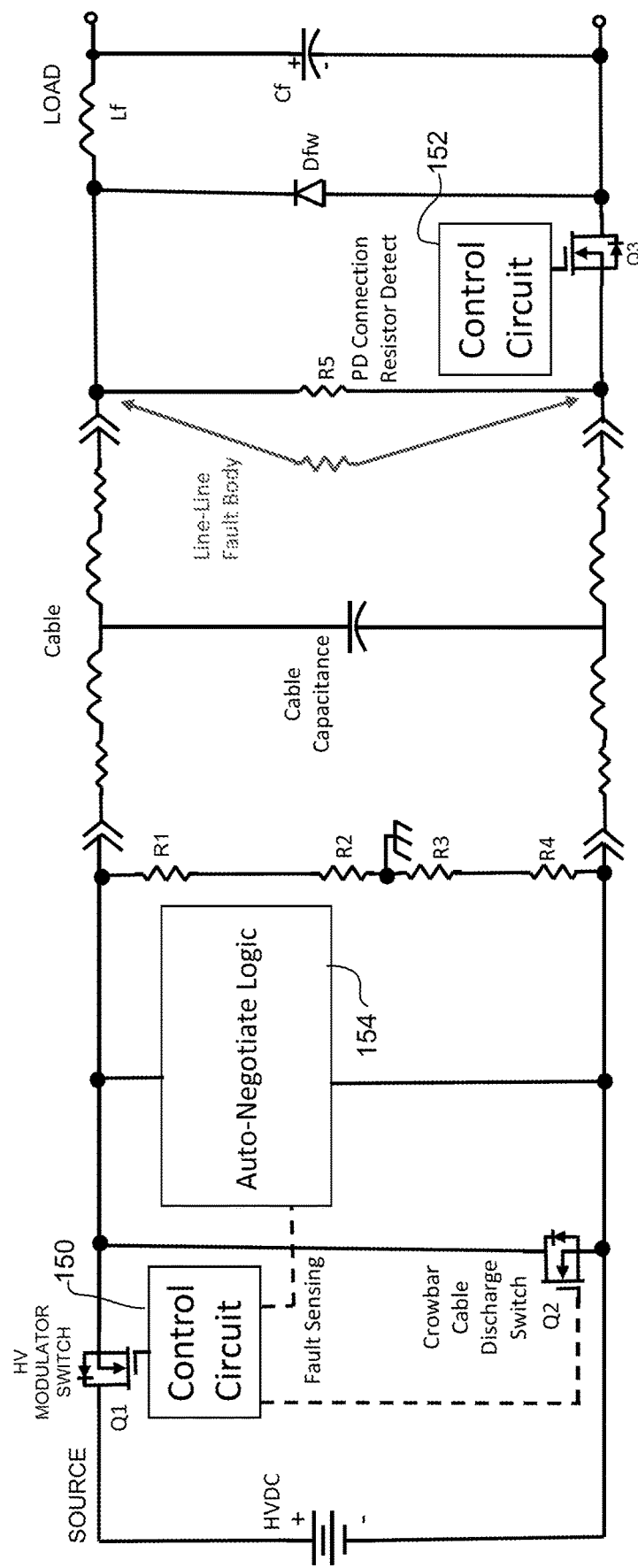
FIG. 15 is a diagram illustrating line-to-line fault detection, in accordance with yet another embodiment.

FIG. 15 illustrates another example of a circuit for use in line-to-line fault detection, in accordance with one embodiment. High voltage is turned off and the PD load circuit is isolated, as previously described. The cable voltage capacitance discharge RC-time for resistance is then evaluated to characterize the normal or safe cable capacitance and the circuit resistances. Auto-negotiation is performed during high voltage off time for line-line fault protection (shock protection) before next high voltage pulse by looking at the cable capacitance voltage RC-time droop slope to an unsafe (fault) level. The circuit includes source control circuit 150, load control circuit 152 and auto-negotiate logic 154. The source control circuit 150 performs fault sensing with the auto-negotiate logic 154, PSE modulator switch Q1, and crowbar cable discharge switch Q2. The load control circuit 152 is in communication with PD DC/DC converter isolation switch Q3. The auto-negotiate logic includes a process for determining capacitance of the cable. In one embodiment, a safe-level off-time/RC time voltage droop level is established based on the R5 PD detect resistance of 100 kohm, for example, with actual cable capacitance at initial startup with first high voltage pulse. Auto-negotiation is then performed for subsequent off-time RC time droop level. In one example, if the droop level is <10 times the safe level from a resistance example of <10 kohm then it is a fault-level and there is no next high voltage pulse, and then trigger Q2 crowbar/discharge of cable capacitance voltage is set to a safe level. In this example, the source includes resistors R1, R2, R3, R4 (e.g., R1 and R4 at 560 kohm, and R2 and R3 at 10 kohm). The load circuit includes inductor Lf, capacitor Cf, and PD connection resistor detect R5 (e.g., 100 kohm).

It is to be understood that the circuits shown in FIGS. 12, 13, 14, and 15 are only examples and that other arrangements or combinations of components (e.g., resistors, capacitors, diodes, inductors, or switches) may be used without departing from the scope of the embodiments. Also, additional circuits or components may be included as needed. For example, in the circuits described above, other than the circuit shown in FIG. 6, the PSU modulator switch Q1 is synced on/off with the Q3 PD isolation switch on/off through data communication or with PD sensing input voltage/current to switch off and isolate the cable for auto-negotiation. However, when high voltage power is off and low voltage power is on at startup, Q3 is off, so an additional circuit may be included to get power before Q3 to power up with a low voltage circuit.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   receiving electrical power at an optical transceiver module at a remote network device on a cable delivering power on an electrical wire and data on an optical fiber from a central network device;
   operating the remote network device in a low voltage mode during fault sensing at the remote network device;
   transmitting on the cable, a data signal to the central network device, said data signal indicating an operating status based on said fault sensing; and
   receiving high voltage power from the central network device on the cable at the remote network device upon transmitting an indication of a safe operating status, wherein the remote network device is powered by the high voltage power;
   wherein the high voltage power comprises high voltage pulse power and wherein said fault sensing is performed between pulses.

2. The method of claim 1 further comprising auto-negotiating with the central network device to identify a type of power to apply at the remote network device and applying a digital interlock setting a power mode of operation at the remote network device.

3. The method of claim 2 wherein said type of power is chosen from PoE (Power over Ethernet) and the high voltage pulse power.

4. The method of claim 1 wherein operating the remote network device in a low voltage mode comprises operating the remote network device in a low voltage mode during startup.

5. The method of claim 1 wherein said fault sensing performed between the pulses comprises fault sensing a power circuit at the remote network device between the pulses.

6. The method of claim 1 wherein the low voltage mode operates at less than 60 volts and the high voltage pulse power comprises high voltage pulses of at least 250 volts.

7. The method of claim 1 wherein the high voltage power comprises unipolar pulse power.

8. The method of claim 1 wherein the high voltage power comprises bipolar pulse power.

9. The method of claim 1 wherein the high voltage power is at least 100 watts and the remote network device is located at a distance greater than 100 meters.

10. The method of claim 1 wherein the high voltage pulse power comprises high voltage direct current load pulse power at a power level greater than 100 watts.

11. The method of claim 1 wherein the data signal indicating an operating status comprises a data communications signal on the optical fiber.

12. The method of claim 1 wherein the high voltage power comprises the pulses at a voltage of at least 250 volts and off time between the pulses at a lower voltage.

13. The method of claim 1 wherein said fault sensing performed with the remote network device in said low voltage mode is performed at a different voltage than said fault sensing performed between the pulses.

14. The method of claim 1 wherein said testing performed between the high voltage pulses comprises line-to-line resistance testing during an off time between the high voltage pulses.

15. A method comprising:
   testing at power sourcing equipment comprising a power and data source, a power circuit between the power sourcing equipment and a powered device upon startup of the powered device and determining that the power circuit is operable to receive high voltage direct current (HVDC) pulse power;
   delivering the HVDC pulse power from the power sourcing equipment to the powered device over a cable delivering the HVDC pulse power and optical data;
   testing at the power sourcing equipment, the power circuit between the power sourcing equipment and the powered device between high voltage pulses; and
   communicating at the power sourcing equipment, with the powered device over the cable to identify an operating mode at the powered device based on said testing;
   wherein the HVDC pulse power and the optical data are received at an optical transceiver module at the power device.

16. The method of claim 15 wherein communicating with the powered device comprises performing auto-negotiation between the power sourcing equipment and the powered device on the cable.

17. The method of claim 15 wherein testing comprises low voltage sensing of the powered device and the cable to check for line-to-line faults.

18. The method of claim 15 wherein said determining that the power circuit is operable to receive the HVDC pulse power comprises receiving an indication that the powered device is operational before delivering the HVDC pulse power.

19. The method of claim 15 wherein the powered device is located at least 1000 meters from the power sourcing equipment and the HVDC power comprises at least 100 watts at peak pulse power.

20. The method of claim 15 wherein the power is pulsed at high power for a duty cycle of between 90% and 95%.

21. The method of claim 15 wherein a time between said testing between the high voltage pulses is approximately 1 millisecond.

22. The method of claim 15 further comprising providing a high-resistance midpoint ground to provide touch-safe line-to-ground protection.

23. The method of claim 15 wherein a width of each of the pulses of the high voltage pulse power is proportional to a direct current line-to-line voltage to provide a touch-safe fault protection.

24. The method of claim 15 wherein said testing comprises a pulse-to-pulse decision for touch-safe line-to-line fault interrogation between the high voltage pulses for safety.

25. The method of claim 15 wherein the high voltage pulse power comprises pulse-on time during the high voltage pulses and pulse-off time between each of the high voltage pulses, wherein said testing is performed during said pulse-off time.

26. An apparatus comprising:
an optical interface for receiving from a power and data source, optical signals on an optical fiber in a power and data cable at an interface module;
an electrical interface for receiving from the power and data source, high voltage pulse power on an electrical wire in the power and data cable at the interface module for powering the apparatus in a high power mode greater than 100 watts; and
a power module for testing a power circuit during an off time between high voltage pulses and delivering a signal indicating an operating status of the power circuit over the power and data cable to the combined power and data source.

27. The apparatus of claim 26 wherein the power module is configured to detect a type of power received at the apparatus and select a delivery method for the power based on the detected type of power.

28. The apparatus of claim 26 wherein the apparatus comprises a powered device configured for operation with the power and data source in a point-to-point connection with the combined power and data source delivering high voltage power of at least 100 watts.

29. The apparatus of claim 26 wherein the power module comprises a low voltage sensing circuit for identifying faults in the apparatus.

30. The apparatus of claim 26 wherein the power circuit comprises a high-resistance midpoint ground circuit for providing ground-fault-detection and ground-fault-isolation.

31. The apparatus of claim 26 further comprising a connector for mating with the power and data cable, the connector comprising an insulated connector with short-pins for touch-safe protection.

32. The apparatus of claim 29, wherein the low voltage comprises 60 volts or less and the high voltage pulses comprise power delivered from the combined power and data source at 300 volts or higher.

33. The apparatus of claim 26 wherein the power module is operable to discharge cable capacitance upon fault detection.

34. The apparatus of claim 26 wherein the power module is operable to calculate droop voltage for use in fault sensing.

35. A method comprising:
receiving low voltage power at an interface module at a remote network device on a cable delivering power and optical data from a central network device;
transmitting on the cable, a signal to the central network device indicating that the remote network device is operable to receive high voltage pulse power; and
receiving the high voltage pulse power from the central network device on the cable at the remote network device upon transmitting said signal, wherein the remote network device is powered by the high voltage pulse power;
wherein testing of a power circuit between the central network device and the remote network device for faults is performed during an off time between high voltage pulses of the high voltage pulse power.

* * * * *